(12) United States Patent  
Gatto et al.

(10) Patent No.: US 8,311,923 B2  
(45) Date of Patent: Nov. 13, 2012

(54) SYSTEM AND METHOD FOR ANALYZING ANALYST RECOMMENDATIONS ON A SINGLE STOCK BASIS

(75) Inventors: Joseph G. Gatto, San Francisco, CA (US); Iain McNeil, Mill Valley, CA (US); Vinesh Jha, San Francisco, CA (US); David Lichtblau, Mill Valley, CA (US)

(73) Assignee: Thomson Reuters (Markets) LLC, New York, NY (US)

( * ) Notice: Subject to any disclaimer, the term of this patent is extended or adjusted under 35 U.S.C. 154(b) by 106 days.

(21) Appl. No.: 13/011,723

(22) Filed: Jan. 21, 2011

(65) Prior Publication Data

US 2011/0119116 A1    May 19, 2011

Related U.S. Application Data

(63) Continuation of application No. 10/965,720, filed on Oct. 18, 2004, now Pat. No. 7,877,309.

(51) Int. Cl.  
*G06Q 40/00* (2006.01)

(52) U.S. Cl. ........................................ 705/36 R; 705/35

(58) Field of Classification Search .............. 705/36–37, 705/35  
See application file for complete search history.

(56) References Cited

U.S. PATENT DOCUMENTS

| | | |
|---|---|---|
| 3,270,190 A | 8/1966 | Lambert |
| 4,884,217 A | 11/1989 | Skeirik et al. ................. 364/513 |
| 4,920,499 A | 4/1990 | Skeirik .......................... 364/513 |
| 4,965,742 A | 10/1990 | Skeirik .......................... 364/513 |
| 5,006,992 A | 4/1991 | Skeirik .......................... 364/513 |
| 5,006,998 A | 4/1991 | Yasunobu et al. ............. 364/513 |
| 5,132,899 A | 7/1992 | Fox ................................ 364/408 |
| 5,220,500 A | 6/1993 | Baird et al. .................... 364/408 |
| 5,365,425 A | 11/1994 | Torma et al. .................. 364/401 |
| 5,500,795 A | 3/1996 | Powers et al. ................. 364/401 |
| 5,502,637 A | 3/1996 | Beaulieu et al. .............. 364/408 |

(Continued)

FOREIGN PATENT DOCUMENTS

JP    2000090150 A    3/2000

(Continued)

OTHER PUBLICATIONS

Lustgarten S, Tang C. Analysts' Heterogeneous Earnings Forecasts and Stock Recommendations. Journal of Accounting, Auditing & Finance [serial online]. Summer2008;23(3):377-401. Available from: Business Source Complete, Ipswich, MA. Accessed Jun. 18, 2012.*

(Continued)

*Primary Examiner* — Hani M Kazimi  
*Assistant Examiner* — Abhishek Vyas  
(74) *Attorney, Agent, or Firm* — Pillsbury Winthrop Shaw Pittman LLP

(57) ABSTRACT

A system and method for measuring and creating a score for the performance of one or more contributor recommendations on a single stock. According to one embodiment, the score may be derived via a payoff function that depends on a variety of factors. For example, the factors may include one or more of: i) the performance of the stock; ii) the performance of a selected benchmark; iii) the recommendation of the contributor for the stock; and/or iv) other factors. According to one embodiment the payoff function may be designed such that certain desired characteristics are satisfied.

23 Claims, 6 Drawing Sheets

U.S. PATENT DOCUMENTS

| | | | | |
|---|---|---|---|---|
| 5,557,513 | A | 9/1996 | Frey et al. | 364/401 R |
| 5,608,620 | A * | 3/1997 | Lundgren | 705/1.1 |
| 5,613,072 | A | 3/1997 | Hammond et al. | 395/204 |
| 5,675,746 | A | 10/1997 | Marshall | 395/235 |
| 5,701,400 | A | 12/1997 | Amado | 395/76 |
| 5,749,077 | A | 5/1998 | Campbell | 705/36 |
| 5,761,442 | A | 6/1998 | Barr et al. | 395/236 |
| 5,774,880 | A | 6/1998 | Ginsberg | 705/36 |
| 5,774,881 | A | 6/1998 | Friend et al. | 705/36 |
| 5,802,518 | A | 9/1998 | Karaev et al. | 707/9 |
| 5,812,988 | A | 9/1998 | Sandretto | 705/36 |
| 5,819,271 | A | 10/1998 | Mahoney et al. | 707/9 |
| 5,845,285 | A | 12/1998 | Klein | 707/101 |
| 5,852,811 | A | 12/1998 | Atkins | 705/36 |
| 5,864,871 | A | 1/1999 | Kitain et al. | 707/104 |
| 5,893,079 | A | 4/1999 | Cwenar | 705/36 |
| 5,909,669 | A | 6/1999 | Havens | 705/11 |
| 5,911,136 | A | 6/1999 | Atkins | 705/36 |
| 5,918,217 | A | 6/1999 | Maggioncalda et al. | 705/36 |
| 5,930,774 | A | 7/1999 | Chennault | 705/36 |
| 5,946,666 | A | 8/1999 | Nevo et al. | 705/36 |
| 5,948,054 | A | 9/1999 | Nielsen | 709/200 |
| 5,950,176 | A | 9/1999 | Keiser et al. | 705/37 |
| 5,956,691 | A | 9/1999 | Powers | 705/4 |
| 5,961,598 | A | 10/1999 | Sime | 709/224 |
| 5,963,922 | A | 10/1999 | Helmering | 705/35 |
| 6,012,042 | A | 1/2000 | Black et al. | 705/36 |
| 6,012,043 | A | 1/2000 | Albright et al. | 705/36 |
| 6,021,397 | A | 2/2000 | Jones et al. | 705/36 |
| 6,064,984 | A | 5/2000 | Ferguson et al. | 705/36 |
| 6,064,986 | A | 5/2000 | Edelman | 705/36 |
| 6,073,115 | A | 6/2000 | Marshall | 705/35 |
| 6,078,904 | A | 6/2000 | Rebane | 705/36 |
| 6,078,924 | A | 6/2000 | Ainsbury et al. | 707/101 |
| 6,119,103 | A | 9/2000 | Basch et al. | 705/35 |
| 6,125,355 | A | 9/2000 | Bekaert et al. | 705/36 |
| 6,154,732 | A | 11/2000 | Tarbox | 705/36 |
| 6,208,720 | B1 | 3/2001 | Curtis et al. | 379/114 |
| 6,236,980 | B1 * | 5/2001 | Reese | 705/36 R |
| 6,253,192 | B1 | 6/2001 | Corlett et al. | 705/36 |
| 6,317,726 | B1 | 11/2001 | O'Shaughnessy | 705/36 |
| 6,370,516 | B1 | 4/2002 | Reese | 705/36 |
| 6,381,635 | B1 | 4/2002 | Hoyer et al. | 709/207 |
| 6,510,419 | B1 | 1/2003 | Gatto | 705/36 |
| 6,606,615 | B1 | 8/2003 | Jennings et al. | 706/24 |
| 6,681,211 | B1 | 1/2004 | Gatto | 705/36 |
| 6,748,389 | B1 | 6/2004 | Cesare et al. | 707/100 |
| 6,792,399 | B1 | 9/2004 | Phillips et al. | 703/2 |
| 7,016,872 | B1 * | 3/2006 | Bettis et al. | 705/36 R |
| 7,249,080 | B1 | 7/2007 | Hoffman et al. | 705/36 |
| 7,251,624 | B1 | 7/2007 | Lee et al. | 705/35 |
| 7,539,637 | B2 | 5/2009 | Gatto | 405/36 R |
| 7,603,308 | B2 | 10/2009 | Gatto | 705/36 R |
| 7,636,680 | B2 | 12/2009 | Gatto | 705/36 R |
| 7,752,112 | B2 | 7/2010 | Gatto et al. | 705/36 |
| 2002/0002524 | A1 | 1/2002 | Kossovsky et al. | 705/36 |
| 2002/0019791 | A1 | 2/2002 | Goss et al. | 705/36 |
| 2002/0022988 | A1 | 2/2002 | Columbus et al. | 705/11 |
| 2002/0077949 | A1 | 6/2002 | Qasem et al. | 705/36 |
| 2002/0082966 | A1 | 6/2002 | O'Brien et al. | 705/36 |
| 2002/0169701 | A1 | 11/2002 | Tarbox et al. | 705/36 |
| 2003/0004766 | A1 | 1/2003 | Sandoval et al. | 705/7 |
| 2003/0018556 | A1 | 1/2003 | Squyres | 705/36 |
| 2003/0023686 | A1 | 1/2003 | Beams et al. | 709/205 |
| 2003/0065600 | A1 | 4/2003 | Terashima et al. | 705/36 |
| 2003/0084059 | A1 | 5/2003 | Kelley et al. | 707/102 |
| 2004/0024656 | A1 | 2/2004 | Coleman | 705/27 |
| 2004/0117286 | A1 | 6/2004 | Charnley, Jr. | 705/36 |
| 2004/0148248 | A1 | 7/2004 | Allen et al. | 705/37 |
| 2004/0172353 | A1 | 9/2004 | Charnley, Jr. | 705/36 |
| 2005/0033807 | A1 | 2/2005 | Lowrance et al. | 709/204 |
| 2005/0049952 | A1 | 3/2005 | Carter | 705/36 |
| 2005/0080695 | A1 | 4/2005 | Gatto | 705/35 |
| 2006/0069635 | A1 | 3/2006 | Ram et al. | 705/37 |
| 2006/0161472 | A1 | 7/2006 | Weild, IV | 705/10 |
| 2006/0178918 | A1 | 8/2006 | Mikurak | 705/7 |
| 2006/0287938 | A1 | 12/2006 | Sherman et al. | 705/35 |
| 2007/0005481 | A1 | 1/2007 | Kedia et al. | 705/37 |
| 2007/0150405 | A1 | 6/2007 | Greenberg et al. | 705/37 |
| 2007/0162365 | A1 | 7/2007 | Weinreb | 705/35 |
| 2007/0162973 | A1 | 7/2007 | Schneier et al. | 726/22 |
| 2007/0282732 | A1 | 12/2007 | Schulman et al. | 705/37 |
| 2008/0120129 | A1 | 5/2008 | Seubert et al. | 705/1 |
| 2009/0299889 | A1 | 12/2009 | Madhavan et al. | 705/35 |

FOREIGN PATENT DOCUMENTS

| | | |
|---|---|---|
| JP | 2004-046454 A | 2/2004 |
| WO | WO 94/06103 | 3/1994 |
| WO | WO 01/80124 | 10/2001 |

OTHER PUBLICATIONS

Chiang, H. (2005). Analyst's Financial Forecast Accuracy and Corporate Transparency. Allied Academies International Conference. Academy of Accounting and Financial Studies. Proceedings, 10(1), 9-14. (Document ID: 1558352021).*

Andrew Leckey. (Jun. 29, 2004). Successful Investing: ; Federated stock a 'buy'; rival May rates a 'hold'. The Charleston Gazette,p. 2D.*

Brown et al., "Composite Analyst Earnings Forecasts: The Next Generation", *Journal of Business Forecasting*, Summer 1990, vol. 9, Issue 2.

Ho et al., "Market Reactions to Messages from Brokerage Ratings Systems", *Financial Analysts Journal*, Feb. 1998, vol. 54, Issue 1.

Lamonica, "The Best and Worst: Bloomberg's Second Annual Analysts Survey, and the Top Analysts Top Picks", *Financial World*, Jan. 30, 1996, vol. 165, Issue 2.

Herzberg et al., "Enhancing Earnings Predictability Using Individual Analyst Forecast", *The Journal of Inversting*, Summer 1999.

Mozes et al., "Modeling Earnings Expectations Based on Clusters of Analyst Forecasts", *The Journal of Investing*, Spring 1999.

The Hulbert Financial Digest, Jan. 20, 2000, vol. XX, No. 5, 11 pages.

De Aenlle, Conrad, "Short-Sellers' Puzzle: Not Whether, but Which?", *International Herald Tribune*, Feb. 12, 1994, 2 pages.

White, Ron, "How Computers Work, Fourth Edition", Que Corporation, Sep. 1998, pp. 159 and 42-49 (12 pages).

Downes, John, "Dictionary of Finance and Investment Terms, Sixth Edition", Barron's Educational Series, Inc., 2003, pp. 594, 674, and 678 (5 pages).

"Dictionary of Business", Peter Collin Publishing, Credo Reference, Capitalization, 2001, 1 page.

"The Motley Fool", The Record, Bergen County, NJ, May 30, 1999, pp. b.03, (2 pages).

"Dow Jones Global Titans Indexes", Dow Jones & Company, Dec. 17, 2000, 1 page.

Unknown, Quote.com, Inc., May 7, 1998, http://web.archive.org/web/20000701-19960101re_/http://www.quote.com, 2 pages.

Unknown, Webster's New World Computer Dictionary, definition of "logarithmic graph", http://www.credoreference.com/entry.do?pp=1& id=3484634&secid=., © 2003, Wiley Publishing, Inc., 1 page.

Unknown, Academic Press Dictionary of Science and Technology, definition of "logarithmic scale", http://www.credoreference.com/entry.do?pp=1&id=3124817&secid=., © 1992, Academic Press., 1 page.

Ross, Stephen A., et al., "Fundamentals of Corporate Finance", Third Edition, © 1995, Richard D. Irwin, Inc., pp. 332-357.

Ross, Stephen A., et at., "Fundamentals of Corporate Finance", Third Edition, © 1995, Richard D. Irwin, Inc., pp. O-8 through O-14.

Bodie, Zvi, et al., "Investments", Third Edition, © 1996, Richard D. Irwin, Inc., pages are the inside front and back covers, page numbers 1-4 were added, 6 pages.

Davis, Mark, "Trying to Find the Newsletter That's Right for You can be Daunting", *Buffalo News*, Mar. 2, 1999 (p. A7), 3 pages.

Hagstrom, Jr., Robert G., "The Warren Buffet Way; Investment Strategies of the World's Greatest Investor", © 1995, John Wiley & Sons, Inc., p. 4.

Lobo et al., "Analysts' Utilization of Historical Earnings Information", *Managerial and Decision Economics*, vol. 12, Oct. 1991, pp. 383-393.

Racanelli, Vito J., "Scoring the Street's Seers", *Barron's*, vol. 85, No. 34, ABI/INFORM Global, Aug. 22, 2005, pp. 37-38, Document ID 886837731.

Chiang, Hsiang-tsai., "Analyst's Financial Forecast Accuracy and Corporate Transparency", *Allied Academies International Conference*, Proceedings of the Academy of Accounting and Financial Studies, Accounting & Tax Periodicals, vol. 10, No. 1, 2005, pp. 9-14, Document ID 1558352021.

Long, William R., Investing with John D. Laupheimer, Jr.; Massachusetts Investors Trust, *New York Times*, Final Edition, col. 1, Aug. 2, 1998, p. 7.

Ojala, Marydee, "Investment Analyst Reports Online", *Database*, vol. 14, No. 1, Feb. 1991, pp. 72-77.

Cox, Raymond A.K., et al., "A Stochastic Model of Superstardom: Evidence from Institutional Investor's All-American Research Team", *Review of Financial Economics 9*, Winter 2000, pp. 43-53.

Herzberg et al., "Enhancing Earnings Predictability Using Individual Analyst Forecasts", *The Journal of Investing*, Summer 1999.

Charles Schwab: Schwab Introduces Analytics Funds; Utilizes Quantitative Techniques to Seek Above-Market Returns.

* cited by examiner

SYSTEM AND METHOD FOR ANALYZING ANALYST RECOMMENDATIONS ON A SINGLE STOCK BASIS

RELATED APPLICATIONS

The present application is a continuation of U.S. Patent application Ser. No. 10/965,720, filed Oct. 18, 2004, now U.S. Pat No. 7,877,309 and entitled "System And Method For Analyzing Analyst Recommendations On A Single Stock Basis", which is hereby incorporated by reference in its entirety into the present application.

FIELD OF THE INVENTION

The invention relates to a system and method for measuring and creating a score for the performance of securities analysts' recommendations on a single stock basis.

BACKGROUND OF THE INVENTION

Contributors make recommendations on stocks taking into account various factors including predicted price appreciation. A contributor may include an analyst, a group of analysts, a brokerage firm, or other contributors. Contributors may convey their recommendations via a recommendation scheme. A recommendation scheme generally will include various-numbers of recommendation levels and a label for each level. For example, a simple three level recommendation scheme may include a positive, negative or neutral. A five level recommendation scheme may include a buy, a strong buy, a sell, a strong sell or a hold. More generally, a recommendation scheme may include one or more recommendations for predicted positive returns, a recommendation for returns that are predicted to be neutral, and one or more recommendations for predicted negative returns. A recommendation scheme may include recommendations relative to a benchmark such as an overweight recommendation for predicted positive returns, an inline recommendation for predicted neutral returns, and an underweight recommendation for predicted negative returns. Other recommendation schemes and labels are known.

For simplicity, as used herein three level recommendation schemes may be generically represented as including a positive recommendation, a neutral recommendation, and a negative recommendation, and five level recommendation schemes may be generically represented as including a more positive recommendation, a positive recommendation, a neutral recommendation, a negative recommendation, and a more negative recommendation. Except as specifically indicated otherwise, this is not intended to exclude other labels.

Different contributors may use recommendation schemes that seem similar based on labels, but may actually correspond to different benchmark-relative returns. For example, a first contributor may use a five level recommendation scheme. A second contributor may use a three level recommendation scheme wherein a positive recommendation corresponds to a predicted benchmark-relative return similar to that of a positive recommendation in the five level recommendation scheme of the first recommendation, and a negative recommendation corresponds to a benchmark-relative return similar to that of a negative recommendation in the five level recommendation scheme of the first contributor. A third contributor may use a three level recommendation scheme wherein a positive recommendation corresponds to a benchmark-relative return similar to that of a more positive recommendation in the five level recommendation scheme of the first contributor, and a negative recommendation corresponds to a benchmark-relative return similar to that of a more negative recommendation in the five level recommendation scheme of the first contributor. In other words, if a five-level scheme has ratings 1-5 (from most positive to most negative) a three level scheme may correspond to levels 1, 3, 5 or it may correspond to 2, 3, 4.

Different contributors may make recommendations based on predictions of benchmark-relative returns that are relative to different benchmarks. Benchmarks may be fixed benchmarks or variable benchmarks. For example, a fixed benchmark may be 5% for a positive and 15% for a more positive at one contributor and other percentages for another contributor. Variable benchmarks may be a market index benchmark related to stock valuations of stocks associated with a market index, an industry benchmark related to stock valuations of stocks within a given industry, or other variable benchmarks.

Various methods exist for measuring the performance of a contributor on all or a large number of stocks via a portfolio calculation approach. These systems typically create a simulated portfolio for a set (e.g., those in an industry classification) of each contributors stocks where the portfolio mimics owning "positive-rated" stocks and shorting negative-rated stocks. These systems may not answer the question of which contributor is best at rating a single stock. Further, these systems may merely yield a possible percent return, and not a score representative of an accuracy of the analyst in predicting future stock valuation. Moreover, a percent return alone can be misleading, depending on the performance of other stocks or benchmarks. These systems usually require a minimum number of stocks followed in the set (e.g., semiconductor industry) to be scored and ranked on that set. In known systems, stocks that have little variation in value may be difficult to compare with other stocks, or they may not take into account separate benchmarks for separate stocks.

Another drawback of existing systems is how to evaluate a neutral recommendation. In a percent return analysis a neutral rating may yield little "return" but may be a very good prediction. Other problems and drawbacks also exist.

Therefore, there exists a need for scoring a contributor for the performance of recommendations by the analyst or analysts with respect to a single stock.

SUMMARY

One aspect of the invention relates to a system and method for measuring and creating a score for the performance of one or more contributor recommendations on a single stock. According to one embodiment, the score may be derived via a payoff function that depends on a variety of factors. For example, the factors may include one or more of: i) the performance of the stock; ii) the performance of a selected benchmark; iii) the recommendation of the contributor for the stock; and/or iv) other factors.

Different types of recommendations may have different payoff functions. According to one embodiment the payoff functions may be designed such that certain desired characteristics are satisfied. For example, according to one approach, and where the contributor selects the recommendation from a set of five recommendation types, the desired characteristics may include one or more of ensuring that: i) a positive recommendation can score higher than a more positive recommendation for a "modest positive" stock return; ii) a neutral recommendation can score higher than a positive recommendation and a negative recommendation (i.e. a neutral can be the single best call on a stock) for certain stock return scenarios; iii) a negative recommendation can score higher than a more negative recommendation for a "modest negative" stock return; iv) a more positive recommendation can score higher than a positive recommendation for a "significantly positive" stock return; and v) a more negative recommendation can score higher than a negative recommendation for a "significantly negative" stock return.

It will be appreciated that while the embodiment of the invention described above may apply where contributors select from a set of recommendations that includes five distinct types of recommendations, an alternative number of types of recommendations may be accounted for. For example, in some instances, an contributor may select from a set of three recommendations, such as a negative recommendation, a neutral recommendation, and a positive recommendation. In this case, the payoff function may be designed such that certain desired characteristics are satisfied. For example, that a neutral recommendation can score higher than a positive recommendation or a negative recommendation (i.e. a neutral can be the single best call on a stock) for certain stock return scenarios. Various aspects of the invention can be used with other recommendation schemes that have other numbers of types of recommendations. Other labels can also be used for the recommendations.

According to various embodiments, a score associated with a recommendation with respect to a stock may be determined as a function of a benchmark-relative return. The benchmark-relative return may include the return of the stock relative to a benchmark return. The return of the stock may include a price change of the stock, a dividend associated with the stock, other distributions associated with the stock, or other returns associated with the stock. In some instances, the benchmark return may include a variable benchmark return. The variable benchmark return may be a market index benchmark return that corresponds to the return of stocks associated with a market index. Or, the benchmark return may be related to a sector or industry benchmark that may correspond to a return of the stocks within a sector or industry group. The benchmark return may be related to a geographical benchmark that may correspond to a return of the stocks within a geographic region associated with the stock. In other instances, the benchmark return may include a fixed benchmark return, such as a fixed percent increase per unit of time, or other fixed benchmark return. For example, the benchmark return for a positive may be set equal to a return of 5% annually. The benchmark return may be set automatically, or may be selected by a user. Other fixed or variable benchmark returns may be used.

More specifically, according to one embodiment of the invention, a payoff function may describe a score for a recommendation as a function of a benchmark-relative return on a stock. For example, a payoff function for a positive recommendation may have a zero value at or near a zero benchmark-relative return and may slope in a positive direction with respect to a benchmark-relative return axis; a payoff function for a more positive recommendation on a stock may have a zero value at a more positive benchmark-relative return, located away from the zero benchmark-relative return in a positive direction, and may be more steeply sloped in a positive direction than the payoff function for the positive recommendation. This implies that the payoff functions for positive recommendations and more positive recommendations may cross and that for recommendations on stocks with small positive benchmark-relative returns, a positive recommendation may be associated with a higher score than a more positive recommendation would. A mirror-image situation may exist for a negative recommendation and a more negative recommendation.

According to one aspect of the invention, the payoff function for a neutral recommendation on the stock may yield a maximum score for the neutral recommendation at or near the zero benchmark-relative return, and lower scores as the benchmark-relative return increases or decreases away from the zero benchmark-relative return axis. This implies that the score for a neutral recommendation may be higher than the score that would be received for a positive recommendation, a more positive recommendation, a negative recommendation, or a more negative recommendation on the same stock, where the stock provides a modest benchmark-relative return. The criteria for defining a modest return can be specified or user selected. Generally it may be desirable for this to include a zero benchmark-relative return plus or minus a range where a neutral recommendation will yield the highest score. Various other parameters of one or more of the payoff functions may selected by a user, or may be determined automatically.

In some embodiments, one or more of the parameters of one or more of the payoff functions may be determined based on one or more aspects of a recommendation scheme associated with a recommendation. For example, for different contributors, a positive recommendation may imply an expected 5% return, while for others it may imply a 1% return. Or, different contributors may determine benchmark-relative return in relationship to separate benchmarks. Other differences may apply. The differences may be taken into account in establishing one or more pay off functions for each contributor-specific recommendation scheme. According to a preferred embodiment, a contributor-specific set of parameters may be used to determined the payoff functions of recommendations used by the contributor.

In another embodiment, recommendations made by different contributors based on different recommendation schemes may be standardized. Standardizing recommendations may include mapping the recommendations into a reference recommendation scheme to facilitate comparisons and for other purposes. The recommendations mapped into the reference recommendation scheme may then be scored according to one or more payout functions with a set of parameters that correspond to the reference recommendation scheme.

In some embodiments of the invention, scores associated with a plurality of individual recommendations may be aggregated into a single score. Aggregating the plurality of scores may provide a collective indicator of the performance of the recommendations. For example, a plurality of scores associated with recommendations made by a contributor with respect to a stock over a selected time period may provide a more complete indicator of a performance of the contributor in predicting future valuation of the stock. In other embodiments, a plurality of recommendations made by a set of contributors with respect to a single stock may be aggregated. Other aggregations may be made.

According to another aspect of the invention, the system and method may also enable the score for contributor recommendations on a single stock to be normalized. For example, the normalization may be based on the "opportunity" to earn points or other factors. According to one embodiment, the normalization may be based on one or more characteristics of the stock, or other factors. For example, the normalization may be based on a volatility of a stock. This may allow for a more meaningful relative comparison of performance.

Another aspect of the invention relates to a roll-up procedure. The roll-up procedure may enable a combined score related to a set of stocks to be created from a set of scores measured and created at the single stock level. According to one embodiment, each single stock level score may be normalized and then used in the combined score. The combined score may be used to score all or some of a set of contributors, such as, a set of analysts associated with a single broker a set of brokers, or other sets of contributors.

Another aspect of the invention relates to a system for implementing various aspects of the invention. The system may include one or more processing sections, one or more data sources, one or more storage sections, and one or more remote terminals.

The processing section may include a benchmark-relative return module, a payoff function module, a score determination module, and a user interface module. The benchmark relative-return module may determine a benchmark-relative return of a stock associated with a recommendation being scored. The payoff function module may, store, configure, manage, or provide other functionality with respect to one or more payoff functions that may be used to create scores for recommendations. The score determination module may determine a score with respect to a single recommendation according to a payoff function provided by the payoff function module. The score determination module may determine an aggregate score based on an aggregation of scores, may normalize one or more scores, may roll-up one or more scores, or may perform other functions. The user interface module may enable a user to create, edit, and/or review one or more payoff functions. The user interface module may enable the user to request calculations of one or more scores including an individual score, an aggregated score, a rolled-up score, or other scores. The user interface module may enable the user to view results generated by the system.

The data sources may provide one or more types of information to the system. The data sources may include a market information section, and a recommendation information section. The market information section may provide stock valuation information to the system. The market information section may provide stock valuation information in response to an information query, or may provide information in a streamed manner. The recommendation information section may provide recommendation information to the system. Recommendation information may include a recommendation source, a stock name associated with a recommendation, a recommendation type, a date a recommendation was made, a time period associated with a recommendation, or other recommendation information. Or, the data sources may provide other information to the processing section.

According to one embodiment, the system may include a storage section. The storage section may include one or more storage components (e.g. databases). The storage section may receive and store various kinds of information. For example, the storage section may store information received from the various data sources including market information, recommendation information, previously generated scores, or other information. The storage section may also store other information, such as previously generated scores and other information.

Another aspect of the invention may relate to a method of creating a score for a single recommendation. The method may include a recommendation information operation, a stock return determination operation, a benchmark return determination operation, a benchmark-relative return determination operation, and a score determination operation.

At the recommendation information operation, recommendation information may be acquired. Recommendation information may include a recommendation (e.g. positive, negative, neutral, etc.), a stock associated with the recommendation, a time period associated with the recommendation, or other recommendation information.

At the stock return determination operation, a return of the stock associated with the recommendation may be determined. The return of the stock may be determined for the time period associated with the recommendation.

A benchmark return may be determined at the benchmark return determination operation. The benchmark return may be determined for the time period associated with the recommendation.

At the benchmark-relative return operation the benchmark-relative return may be determined. The benchmark-relative return may be determined by subtracting the return of the benchmark from the return of the stock.

A score for the recommendation may be determined at the score determination operation. The score may be determined by applying a payoff function that corresponds with the recommendation to the benchmark-relative return.

Another aspect of the invention may relate to a method of determining an aggregated score associated with a plurality of recommendations on a single stock. The method may include an individual score determination operation, an individual score summing operation, an individual score completion operation, an individual score averaging operation, and a normalizing operation.

At the individual score determination operation, a score for an individual recommendation from the plurality of recommendations may be determined. The score for the individual recommendation may be determined according to the method of creating a score for a single recommendation.

The score for the individual recommendation may be combined with previously determined scores at the individual score summing operation. The individual recommendations may be combined by addition.

At the individual score completion determination operation a determination may be made as to whether all of the recommendation in the plurality of recommendations have been scored and summed. If all of the recommendations have not been scored and summed, the method may return to the individual score determination operation to determine a score for another individual recommendation. If all of the recommendations have been scored and summed, the method may proceed to the individual score averaging operation.

The sum of the scores of the individual recommendations may be averaged at the individual score averaging operation. The scores may be averaged by dividing the sum of the scores by the number of recommendations in the plurality of recommendations.

At the normalizing operation, the averaged score may be normalized. The averaged score may be normalized by the opportunity associated with the stock for the time periods associated with the recommendations.

DETAILED DESCRIPTION OF THE DRAWINGS

One aspect of the invention relates to a system and method for measuring and creating a score for the performance of one or more of a contributor's recommendations on a single stock. According to one embodiment, the score may be derived via a payoff function that depends on a variety of factors. For example, the factors may include one or more of: i) the performance of the stock; ii) the performance of a selected benchmark; iii) the recommendation of the contributor for the stock; and/or iv) other factors.

Different types of recommendations may have different payoff functions. According to one embodiment the payoff functions may be designed such that certain desired characteristics are satisfied. For example, according to one approach, and where the contributor selects the recommendation from a set of five recommendation types, the desired characteristics may include one or more of ensuring that: i) a positive recommendation can score higher than a more positive recommendation for a "modest positive" stock return; ii) a neutral recommendation can score higher than a positive recommendation and a negative recommendation (i.e. a neutral can be the single best call on a stock) for certain stock return scenarios; iii) a negative recommendation can score higher than a more negative recommendation for a "modest negative" stock return; iv) a more positive recommendation can score higher than a positive recommendation for a "significantly positive" stock return; and v) a more negative recommendation can score higher than a negative recommendation for a "significantly negative" stock return.

Figure 1:
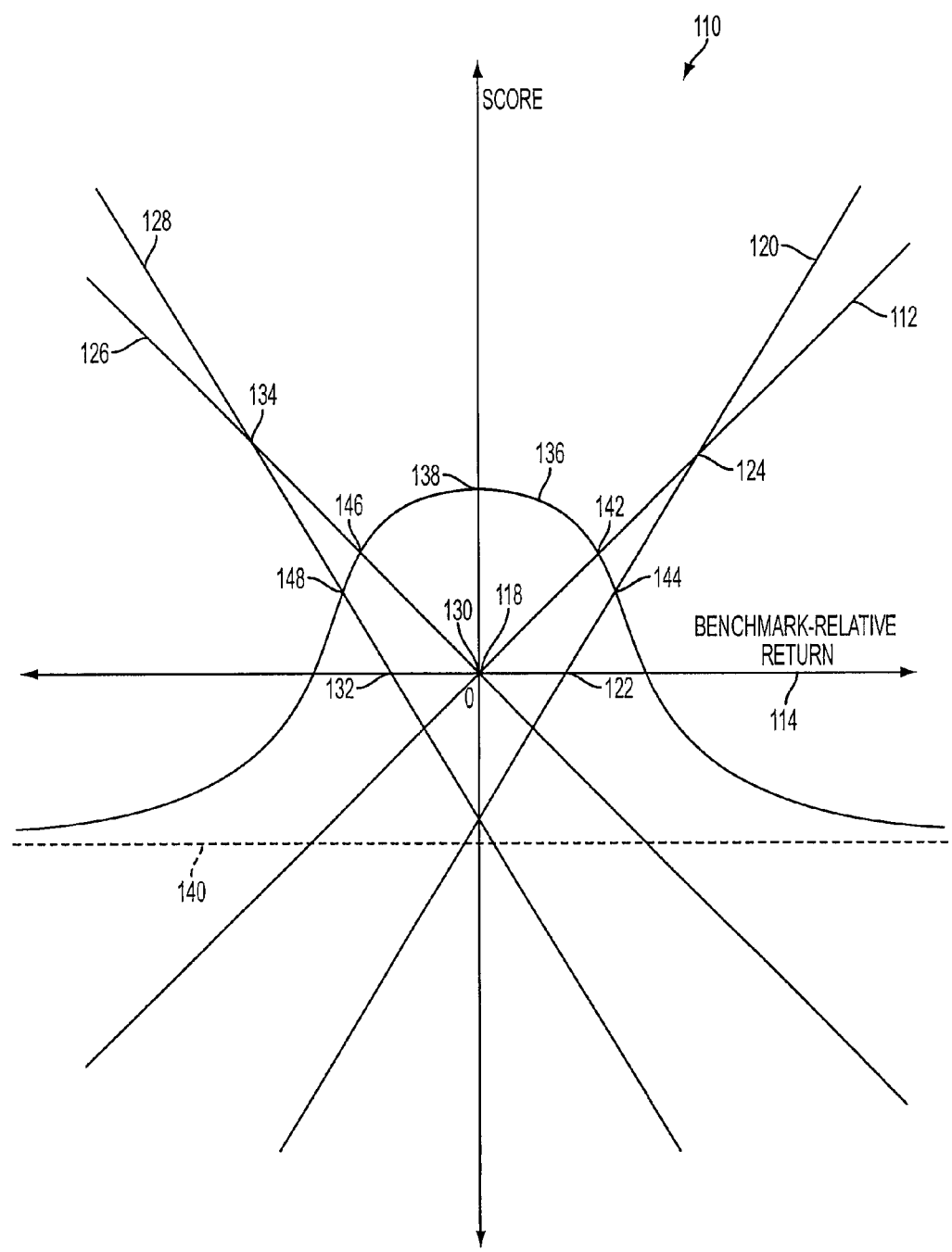
FIG. 1 illustrates an exemplary embodiment of a plurality of payoff functions.

FIG. 1 illustrates an exemplary embodiment of a plurality of payoff functions 110. Payoff functions 110 may describe a score for a recommendation as a function of a benchmark-relative return on a stock. For example, a positive payoff function 112 may describe a score for a positive recommendation. Positive payoff function 112 may have a positive zero value 118 at or near a zero benchmark-relative return axis 116, and may slope in a positive direction with respect to a benchmark-relative return axis at a positive slope. Positive zero value 118 may represent a benchmark-relative return for which positive payoff function 112 may yield a score of zero.

In some embodiments of the invention, payoff functions 110 may include a more positive payoff function 120. More positive payoff function 120 may correspond to a more positive recommendation on a stock. More positive payoff function 120 may have a more positive zero value 122 at a positive benchmark-relative return, and may slope in a positive direction with respect to benchmark-relative return axis 114 at a more positive slope. More positive zero value 122 may represent a higher benchmark-relative return than positive zero value 118. The more positive slope may be steeper than the positive slope.

As illustrated in FIG. 1, according to one embodiment of the invention, positive payoff function 112 and more positive payoff function 120 may cross at a more positive/positive intersection 124. Thus, for modest positive benchmark-relative stock returns, such as stock benchmark-relative returns that correspond to a more negative benchmark-relative return than the more positive/positive intersection 124, a positive recommendation may be associated with a higher score than a more positive recommendation would.

Various parameters of positive payoff function 112 and/or more positive payoff function 120 may be determined as default settings. Or, one or more of the parameters may be configured by a user. The parameters may include positive zero value 118, more positive zero value 122, the positive slope, the more positive slope, more positive/positive intersection 124, or other parameters.

In a preferable embodiment, a mirror-image situation of negative payoff function 112 and more negative payoff function 120 may exist for a negative payoff function 126 and a more negative payoff function 128. More specifically, negative payoff function 126 for describing a score of a negative recommendation may have a negative zero value 130 at or near the zero benchmark-relative return, and may slope in a negative direction with respect to benchmark-relative return axis 114 at a negative slope.

According to various embodiments of the invention, payoff functions 110 may include a more negative payoff function 128. More negative payoff function 128 may correspond to a more negative recommendation on a stock. More negative payoff function 128 may have a more negative zero value at a negative benchmark-relative return, and may slope in a negative direction with respect to benchmark-relative return axis 114 at a more negative slope. The more negative slope may be steeper than the negative slope. More negative zero value 132 may correspond to a lower benchmark-relative return than negative zero value 130.

As illustrated in FIG. 1, according to one embodiment of the invention, negative payoff function 126 and more negative payoff function 128 may cross at a more negative/negative intersection 134. Thus, for modest negative benchmark-relative returns, such as stock benchmark-relative returns greater than more negative/negative intersection 134, a negative recommendation may be associated with a higher score than a more negative recommendation would.

Various parameters of negative payoff function 126 and/or more negative payoff function 128 may determined as default settings. Or, one or more of the parameters may be configured by a user. The parameters may include negative zero value 130, more negative zero value 132, the negative slope, the more negative slope, more negative/negative intersection 134, or other parameters.

Additionally, payoff functions 110 may include a neutral payoff function 136 for a neutral recommendation on a stock. Neutral payoff function 136 may be configured such that, where a stock provides a modest benchmark-relative return, a score for a neutral recommendation may be higher than a score for a positive recommendation, a more positive recommendation, a negative recommendation, or a more negative recommendation on the same stock. Neutral payoff function 136 may intersect with positive payoff function 112 at a positive hurdle point 142. For stock returns more negative than that of positive hurdle point 142, a neutral recommendation may yield a higher score than a positive recommendation. neutral payoff function 136 may intersect with more positive payoff function 120 at a more positive hurdle point 144. For stock returns more negative than that of more positive hurdle point 144, a neutral recommendation may yield a higher score than a more positive recommendation. Similarly, neutral payoff function 136 may intersect with negative payoff function 126 at a negative hurdle point 146. For stock returns more positive than that of negative hurdle point 146, a neutral recommendation may yield a higher score than a negative recommendation. Neutral payoff function 136 may intersect with more negative payoff function 128 at a more negative hurdle point 148. For stock returns more positive than that of more negative hurdle point 148, a neutral recommendation may yield a higher score than a more negative recommendation.

In preferred embodiments of the invention, neutral payoff function 136 may yield a maximum score for a neutral recommendation at a maximum point 138. Maximum point 138 may occur at or near zero% benchmark-relative-return axis 116. Neutral payoff function 136 may taper off and yield lower scores as the benchmark-relative return of the stock increases or decreases. Neutral payoff function 136 may taper off to a minimum value 140. Tapering off to minimum value 140 may include exponentially decaying to minimum value 140. It will be appreciated that although Neutral payoff function 136 is illustrated as a curve, other configurations may be employed. For example, neutral payoff function 136 may be configured to resemble a triangle function that comes to a peak at maximum point 138. Other configurations exist.

Various parameters of neutral payoff function 136 may determined as default settings. Or, one or more of the parameters may be configured by a user. The parameters may include a score of maximum point 138, a benchmark-relative return at which maximum point 138 occurs, minimum value 140, a shape of neutral payoff function 136, positive hurdle point 142, more positive hurdle point 144, negative hurdle point 146, more negative hurdle point 148, or other parameters.

An exemplary embodiment of a positive payoff function may be described as:

$$P_{Bst} = \max(\text{MIN}_B, (R_{st} - Z_B) * S_B), \qquad (1)$$

where $\text{MIN}_B$ may represent the minimum payout for a positive recommendation; $R_{st}$ may represent a benchmark-relative return of the stock for a time period related to the recommendation; $Z_B$ may represent a zero cross for the positive recommendation; and $S_B$ may represent the slope for the positive recommendation. The zero cross for a positive recommendation may be equal determined according to the following equation:

$$Z_B = \hat{Z}_B \sqrt{\frac{T_t}{T_{year}}}, \qquad (1)$$

where $\hat{Z}_B$ may represent a configurable positive zero cross for a positive recommendation that may be associated with a time period of the benchmark, which may be selectable by the user; $T_t$ may represent a number of weekdays associated with the positive recommendation; and $T_{year}$ may represent the number of weekdays associated with the benchmark.

An exemplary embodiment of a more positive payout function may be described as:

$$P_{SBst} = \max(\text{MIN}_{SB}, (R_{st} - Z_{SB}) * S_{SB}), \qquad (1)$$

where $\text{MIN}_{SB}$ may represent a minimum score for a more positive recommendation; $R_{st}$ may represent a benchmark-relative return of the stock for a time period related to the recommendation; $Z_{SB}$ may represent a zero cross for the more positive recommendation; and $S_{SB}$ may represent a more positive slope. The zero cross for the more positive recommendation may be determined in a similar manner to the zero cross for the positive recommendation illustrated above.

An exemplary embodiment of a negative payoff function may be described as:

$$P_{S\,st} = \max(\text{MIN}_S, (R_{st} - Z_S) * S_S), \qquad (1)$$

where $\text{MIN}_{S'}$ may represent a minimum score for a negative recommendation; $R_{st}$ may represent a benchmark-relative return of the stock for a time period related to the negative recommendation; $Z_S$ may represent a zero cross for the negative recommendation; and $S_S$ may represent a negative slope.

An exemplary embodiment of a more negative payout function may be described as:

$$P_{SS\,st} = \max(\text{MIN}_{SS}, (R_{st} - Z_{SS}) * S_{SS}), \qquad (1)$$

where $\text{MIN}_{SS}$ may represent a minimum score for a more negative recommendation; $R_{st}$ may represent a benchmark-relative return of the stock for a time period related to the more negative recommendation; $Z_{SS}$ may represent a zero cross for the more negative recommendation; $S_{SS}$ and may represent a more negative slope.

It will be appreciated that while the embodiment of the invention described above may apply where contributors select from a set of recommendations that includes five distinct types of recommendations, an alternative number of types of recommendations may be accounted for. For example, in some instances, a contributor may select from a set of recommendations that includes a negative recommendation, a neutral recommendation, and a positive recommendation. Or, a contributor may select from a set of recommendations that includes a more negative recommendation, a negative recommendation, a weak negative recommendation, a neutral recommendation, a weak positive recommendation, a positive recommendation, and a more positive recommendation. Other sets of recommendations exist.

In some embodiments, one or more of the parameters of one or more of the payoff functions may be determined based on one or more aspects of a recommendation scheme associated with a recommendation. For example, an aspect of a recommendation scheme may include a benchmark-relative return associated with a more positive recommendation within the recommendation scheme, a benchmark-relative return associated with a positive recommendation within the recommendation scheme, a benchmark-relative return associated with a negative recommendation within the recommendation scheme, a benchmark-relative return associated with a more negative within the recommendation scheme, a benchmark used to determine a benchmark-relative return within the recommendation scheme, or other aspects of the recommendation scheme. According to a preferred embodiment, a contributor specific set of parameters may be determined according to a recommendation scheme used by a contributor.

In another embodiment, recommendations made within a plurality of recommendation schemes including different aspects may be standardized. Standardizing a recommendation may include mapping the recommendation into a reference recommendation scheme by mapping the aspects of the recommendation scheme in which the recommendation was made into the aspects of the reference recommendation scheme. The recommendations mapped into the reference recommendation scheme may then be scored according to one or more payout functions with a set of parameters that correspond to the reference recommendation scheme.

Figure 2:
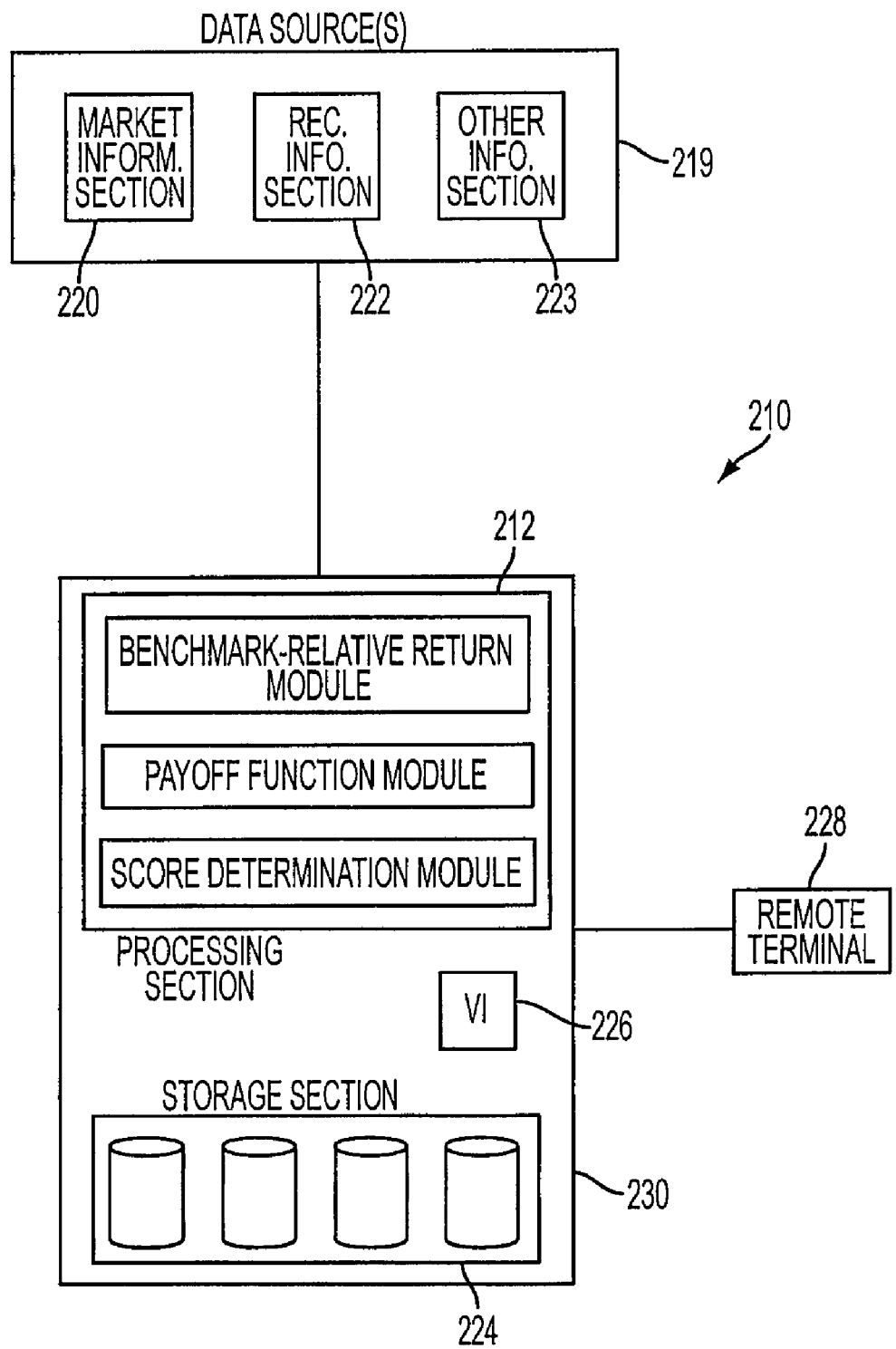
FIG. 2 illustrates an exemplary embodiment of a system for creating a score for a contributor for the performance of the contributor's recommendation on a single stock.

FIG. 2 illustrates an exemplary embodiment of a system 210 for implementing various aspects of the invention. System 210 may include a processing section 212. Processing section 212 may process information to create one or more scores for contributor recommendations. Processing section 212 may include a benchmark-relative return module 214. Benchmark-relative return module 214 may determine a benchmark-relative return of a stock associated with a recommendation being scored. Processing section 212 may include a payoff function module 216. Payoff function module 216 may store, configure, manage, or provide other functionality with respect to one or more payoff functions that may be used to create scores for recommendations. Processing section 212 may include a score determination module 218. Score determination module 218 may determine scores for recommendations based on information received from other modules within processing section 212 and information received from outside processing section 212. Score determination module 218 may determine a score with respect to a single recommendation, may determine an aggregate score based on an aggregation of scores, may normalize one or more scores, may roll-up one or more scores, or may perform other functionalities. Although benchmark-relative return module 214, payoff function module 216, and score determination module 218 are illustrated in FIG. 2 as being present at processing section 212, it will be appreciated that some or all of the functionality provided by the various modules may be located remotely with respect to processing section 212.

In some embodiments, system 210 may include one or more data sources 219. Data sources 219. Data sources 219 may be operatively linked with processing section 212 such that data may be provided from data sources 219 to processing section 212. For example, data sources 219 may include a market information section 220, a recommendation information section 222, or may provide other data to processing section 212 from other information section 223.

Market information section 220 may provide stock valuation information to processing section 210. Market information section 220 may selectively provide stock valuation information, such as for a selected stock or group of stocks, or market information section may provide an indiscriminate feed of stock market information, or other stock valuation information to processing section 212.

According to one embodiment, recommendation information section 222 may provide information regarding one or more recommendations to processing section 212. For example, recommendation information section 222 may provide recommendation information to processing section 212 as recommendations are made, may provide recommendation corresponding to previously made recommendations, or provide other recommendation information to processing section 212 so that recommendations may be scored by system 210. Recommendation information may include a recommendation source, such as a contributor, a stock name associated with a recommendation, a recommendation type, or other recommendation information.

In various embodiments of the invention, system 210 may include a storage section 224. Storage section 224 may receive and store various kinds of information. For example, storage section 224 may store market information, recommendation information, previously generated scores, or other information. Storage section 224 may include one or more storage components (e.g. databases) configured to store the information. Storage section 224 may provide previously stored information to system 210 at various times. For example, storage section 224 may provide previously created scores to processing section 212 for aggregation by score determination module 218. Or, storage section 224 may provide stored market information and/or recommendation information to processing section 212. It will be appreciated that storage section 224 may be associated with a single physical location, or storage section 224 may include a plurality of storage modules located remotely from each other. For example, storage section 224 may include a score storage module, a market information storage module, a recommendation information storage module, a user profile storage module for storing one or more user profiles associated with a plurality of users, or other storage modules.

According to a preferred embodiment, system 210 may include an interface module 226. User interface module 226 may enable a user to create, edit, and/or review one or more payoff functions. User interface module 226 may enable the user to request calculations of one or more scores including an individual score, an aggregated score, a rolled-up score, or other scores. User interface module 226 may enable the user to view results generated by system 210.

In some embodiments, system 210 may include one or more remote terminals 228. Remote terminal 228 may enable a user to access system 210. Remote terminal 228 may access system 210 via interface module 226. Access via interface module 226 may be enables via a graphical user interface, or other remote interface.

In the exemplary embodiment illustrated in FIG. 2, the various components of system 210 may be operatively linked via a network. In such embodiments, system 210 may include one or more servers 230 that may include processing section 212, storage section 224, and/or interface 226. Remote terminal 228 may include a client that may include a graphical interface that may provide a user with access to system 210. It will be appreciated that various components illustrated as being include in server 230 may be relocated to run on remote terminal 228.

According to various embodiments, the benchmark-relative return, as determined by benchmark relative return module 214, may include the return of the stock relative to a benchmark return associated with the stock. In some instances, the benchmark return may be related to a fixed benchmark hurdle, such as a fixed percent increase per unit of time, or other fixed benchmark return. In other instances, the benchmark return may be related to a market benchmark return. The market benchmark may correspond to the return of stocks associated with a market that the stock is associated with. Or, the benchmark return may be related to a sector or industry benchmark that may correspond to a return of the stocks within a sector or industry group associated with the stock. In one embodiment, the benchmark return may be related to a geographical benchmark that may correspond to a return of the stocks within a geographic region associated with the stock. Alternatively, the benchmark return may be configured by a user. Other benchmark returns may be utilized.

According to an embodiment wherein benchmark relative return module 214 applies a fixed benchmark hurdle, the return rate may need to be adjusted to a length of a recommendation to yield an acceptable benchmark hurdle. For example, if the fixed benchmark hurdle is 5% annually, but the recommendation is only for a week, a 1% return on the stock for the week of the recommendation would appear to fall short of the 5% benchmark hurdle by 4%. However, since the benchmark hurdle was specified in annual teens, the benchmark hurdle may be decreased to some lower number for shorter periods of time. For instance, the benchmark hurdle of 5% annually may be lowered to 0.5% for one week, or otherwise adjusted. This adjustment of the benchmark hurdle for time may be non-linear. In other embodiments, for recommendations that correspond to a longer period of time than the benchmark hurdle, the benchmark hurdle may be increased to adjust for the time difference. Although fixed benchmark hurdles are generally described in terms of an annual return, it will be appreciated that the fixed benchmark hurdle may correspond to any amount of time, and may be adjusted from that time to correspond to a time period associated with a recommendation.

In some embodiments of the invention, benchmark-relative return module 214 may adjust the fixed benchmark hurdle according to a benchmark adjustment equation. Adjusting the fixed benchmark hurdle according to the benchmark adjustment equation may enhance benchmark-relative return determination by benchmark-relative return module 214. The following is an exemplary embodiment of a fixed benchmark return equation:

$$\hat{B}=(1+B)^{(t/T)}-1, \quad (1)$$

where B hat is the benchmark hurdle adjusted for the length of the recommendation, B is the percent return associated with the benchmark hurdle, which is 5% per year in this example, t is the length of the recommendation, in weekdays, and T is the number of weekdays in the length of the time period associated with the benchmark hurdle, which in this case is 261 (one year).

In some embodiments of the invention, a plurality of scores stored at score storage module 224 may be aggregated by score determination module 218 into a single score. Aggregating the plurality of scores may provide a collective indicator of the performance of the plurality of recommendations. In some instances, a plurality of scores associated with recommendations made by a contributor with respect to a stock over a selected time period may be aggregated. For example, a contributor may cover a stock for a twelve month period with a positive recommendation that may last for the first six months, and a negative recommendation that may last the rest of the twelve month period. Aggregating the scores for both recommendations made by the contributor may provide a more complete indicator of a past performance of the contributor in predicting then-future valuation of the stock.

In other embodiments, the plurality of recommendations may include a plurality of recommendations made by a plurality of contributors with respect to a single stock. For instance, a plurality of analysts associated with a broker may cover the single stock for a period of time. A broker-level score, in such cases, may include aggregating the scores associated with the single stock for each analyst associated with the broker over the time period. The aggregate scores for each analyst may then be aggregated to provide a score related to a past performance of the broker as a whole. Or, the broker may cover the single stock over the period of time with different analysts. For example, a first analyst associated with the broker may make one or more recommendations on the single stock for a beginning portion of the time period, but may make no further recommendations for the time period. A second analyst associated with the broker may begin to make one or more recommendations for the single stock when the first analyst stops making recommendations on the single stock at the end of the beginning portion of the time period, and may cover the single stock for the remainder of the time period. In such instances, a broker-level score for the time period may include an aggregation of the score of the first analyst for the beginning portion of the time period with the score of the second analyst over the remainder of the time period.

Another aspect of the invention relates to a roll-up procedure that may be performed by score determination module 218. The roll-up procedure may enable a stock set level score related to a set of stocks included in a stock set to be created from a set of scores measured and created at the single stock level. The stock set may include a set of stocks selected by a user, included in a market index, a set of stocks determined automatically, or other sets of stocks. Since a single contributor may not cover, or make recommendations on, each stock within the set of stocks, a set of scores that correspond to recommendations made by a set of contributors, such as a set of analysts within a single broker, a set of brokers, or other sets of contributors, with respect to the set of stocks may be rolled-up to create a stock set level score. More specifically, each contributor in the set of contributors may cover one or more of the stocks in the stock set and a score measured and created at the single stock level may be created for each of the recommendations made on the stocks within the set of stocks made by the contributors. The resulting set of scores created at the single stock level may be rolled-up to represent a stock set level score of the recommendations made by the set of contributors. Stock set level scores may enable the performance of the recommendations made by the set of contributors on the stock set to be compared with recommendations made by another set of contributors on the same stock set. For example, each set of contributors may include a set of analysts associated with a single broker, and the stock set level scores may enable the performance of recommendations made by the brokers on the stock set to be compared or ranked.

According to another aspect of the invention, system 210 may also enable the score for a single stock to be normalized by score determination module 218. For example, the normalization may be based on the "opportunity" to earn points. This may allow for a more meaningful relative comparison of performance on one stock to that of the same contributor, or a different contributor, on a different stock. In some instances, this may enable a comparison between contributors or groups of contributors that cover different or partially overlapping sets of stocks. For example, a first contributor may cover a first stock set and a second contributor may cover a second stock set. The first stock set may include a first stock that is not included in the second stock set. If the first stock experienced an extreme change in price during a time period, then the first contributor may have had an increased opportunity for a high score during the time period with respect to an opportunity the second contributor that did not cover the first stock. Normalizing the scores of the first contributor's coverage of the first stock set and the scores of the second contributor's coverage of the second stock set for the time period, before comparing the scores, may provide a more accurate comparison of the past performance of the first contributor and the second contributor. Normalizing scores of recommendations may also have the benefit of allowing a rollup of scores by score determination module 218. The normalization of a score may be based on one or more characteristics of a stock associated with the score.

In an exemplary embodiment, normalizing a score according to a degree of volatility may be performed according to the following equation:

$$P_{sx}=\hat{P}_{sx}/RD_{st}, \quad (1)$$

where $\hat{P}_{sx}$ may represent an pre-normalization score and $RD_{st}$ may represent a risk divisor. The risk divisor may be determined as the average absolute excess return of the stock over the benchmark. It may be capped by a minimum and maximum since very small numbers may raise a small divisor issue and very large numbers may exaggerate a riskiness of stocks that have been volatile recently. The risk divisor may be determined according to the following equation:

$$RD_{st} = \text{MAX}\left(\hat{D}_{min}, \text{MIN}\left(\hat{D}_{max}, \frac{\sum_{t=1}^{n}|R_{st}-B_{st}|}{n}\right)\right), \quad (1)$$

where $\hat{D}_{min}=D_{min}*\sqrt{t/12}$ and $\hat{D}_{max}=D_{max}*\sqrt{t/12}$, and where t goes from 1 to n months. In this case, n may represent a number of months for which a contributor had any coverage on the stock, excluding the current month if it has not yet ended. In other words, the stock's return for an entire month may be used if the contributor had any coverage during that month, unless the month has not yet ended. The minimum and maximum risk divisors may be adjusted so they are on a monthly, rather than annual, basis.

Figure 3:
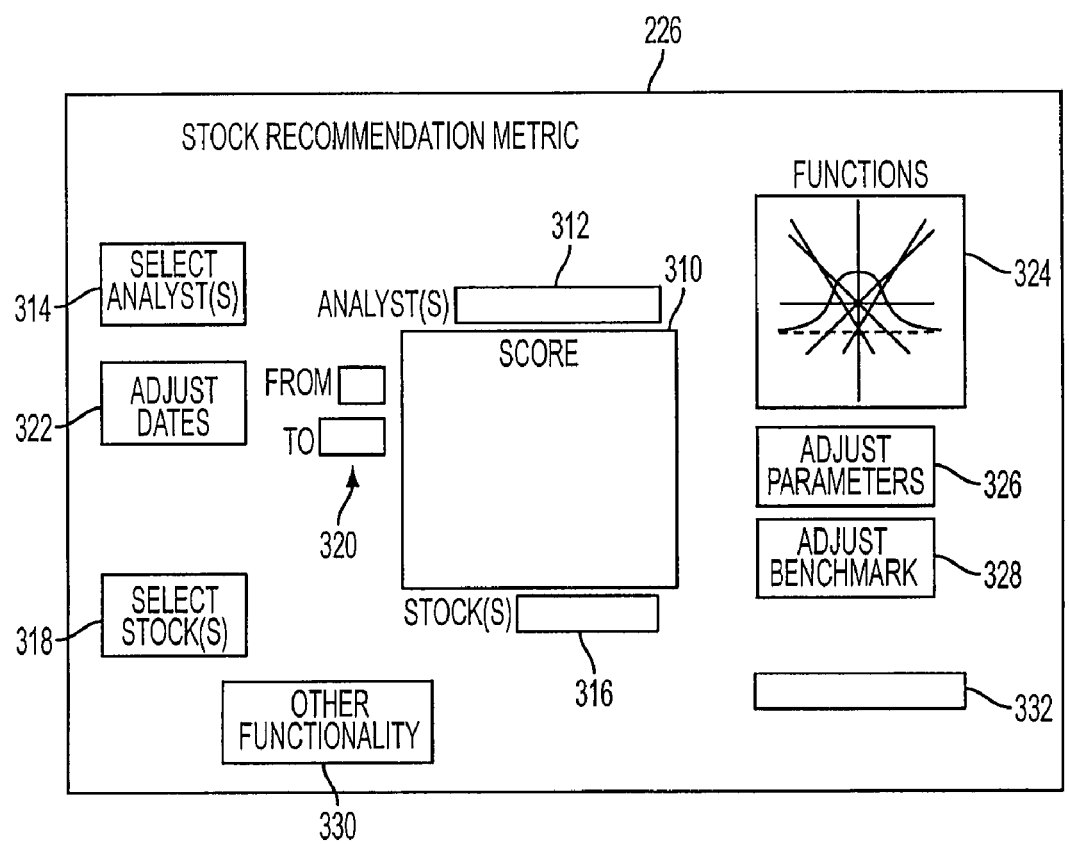
FIG. 3 illustrates an exemplary embodiment of an interface.

FIG. 3 illustrates an exemplary embodiment of a graphical user interface 308 for accessing system 210 via interface module 226. Graphical user interface 308 may include a graphical user interface. Graphical user interface 308 may include a score display field 310. Score display field 310 may enable a user to view one or more scores. Graphical user interface 308 may include a contributor field 312 that may enable the user to view and/or select one or more contributors. A select contributor button 314 may enable the user to select one or more different contributors for evaluation, or may activate a contributor selection made by the user at contributor field 312. Graphical user interface 308 may include a stock field 316 that may enable the user to view and/or select one or more stocks. A select stock button 318 may enable the user to select one or more different stocks for evaluation, or may activate a stock selection made by the user at stock field 316. A time period field 320 may enable the user to view and/or select a time period. Interface 226 may include an adjust time period button 322 that may enable the user to select a different time period for evaluation, or may activate a time period selection made at time period field 320.

In some embodiments, graphical user interface 308 may include a payoff functions field 324. Payoff functions field 324 may provide the user with information regarding one or more payoff functions being used to create a score. Information regarding the payoff functions may include a graphical display of the payoff functions, a display of numeric values related to one or more parameters of the payoff functions, or other information. Graphical user interface 308 may include an adjust parameters button 326. Adjust parameters button 326 may enable the user to adjust one or more of the parameters of one or more of the payoff functions, such as, a zero cross, a hurdle, an intersection, a slope, a maximum value, a minimum value, a function shape, or other parameters. Adjusting the parameters may include creating and storing a preferred parameter profile. One or more preferred parameter profiles may be stored within storage section 224 by the user. The preferred parameter profiles may be recalled by the user via graphical user interface 308 to be create scores at score determination module 218. For example, the user may cause more than one preferred parameter profile to be applied to payoff functions for creating multiple scores with respect to a single recommendation or recommendations. An adjust benchmark button 328 provided by graphical user interface 308 may enable a user to adjust a benchmark used to determine a benchmark-relative return for creating a score. In a preferred embodiment, a benchmark selection may be stored in a preferred parameter profile. This may enable a previously stored benchmark to be selected by invoking a preferred parameter profile.

It will be appreciated that the exemplary embodiment of graphical user interface 308 illustrated in FIG. 3 may not include an exhaustive collection of functionalities that may be made accessible to the user via graphical user interface in other contemplated embodiments. For example, other functionality may be provided to the user via an other functionality button 330 and/or an other functionality field 332. Alternatively, graphical user interface 308 may also be configured to provide less functionality to the user.

Figure 5:
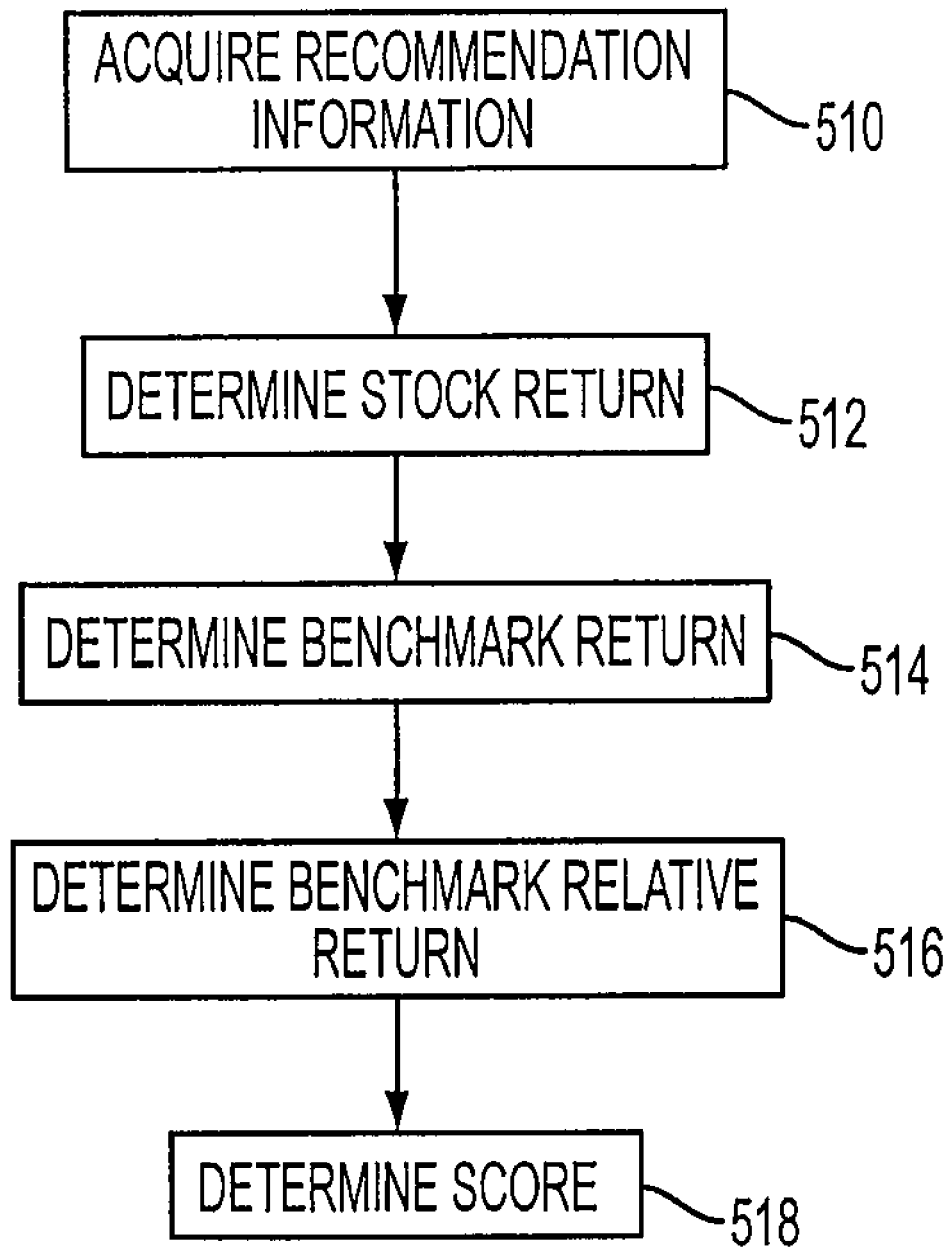
FIG. 5 illustrates an operation according to various embodiments of the invention.

FIG. 5 illustrates an exemplary embodiment of a method of creating a score for a single recommendation. The method may include a recommendation information operation 510, a stock return determination operation 512, a benchmark return determination operation 514, a benchmark-relative return determination operation 516, and a score determination operation 518.

At recommendation information operation 510, recommendation information may be acquired. Recommendation information may include a recommendation (e.g. positive, negative, neutral, etc.), a stock associated with the recommendation, a time period associated with the recommendation, or other recommendation information.

At stock return determination operation 512, a return of the stock associated with the recommendation may be determined. The return of the stock may be determined for the time period associated with the recommendation.

A benchmark return may be determined at benchmark return determination operation 514. The benchmark return may be determined for the time period associated with the recommendation.

At benchmark-relative return operation 516 the benchmark-relative return may be determined. The benchmark-relative return may be determined by subtracting the return of the benchmark from the return of the stock.

A score for the recommendation may be determined at score determination operation 518. The score may be determined by applying a payoff function that corresponds with the recommendation to the benchmark-relative return.

Figure 6:
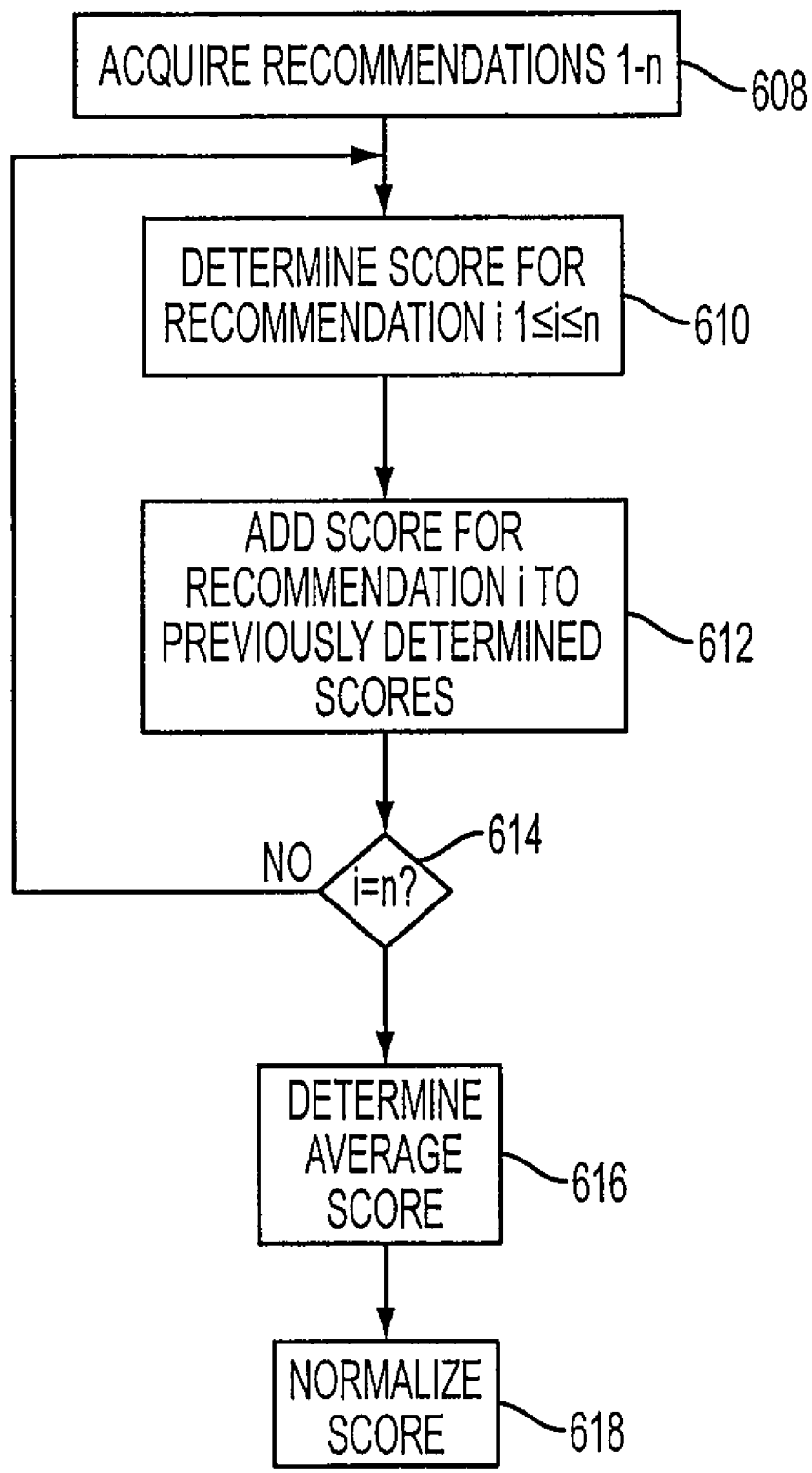
FIG. 6 illustrates an operation according to various embodiments of the invention.

FIG. 6 illustrates an exemplary embodiment of a method of determining an aggregated score associated with a plurality of recommendations on a single stock. The method may include a recommendation acquisition operation 608, an individual score determination operation 610, an individual score summing operation 612, an individual score completion operation 614, an individual score averaging operation 616, and a normalizing operation 618.

The plurality of recommendations may be acquired at recommendation acquisition operation 608. The recommendations may be acquired by selection, or they may be automatically acquired.

At individual score determination operation 610, a score for an individual recommendation from the plurality of recommendations may be determined. The score for the individual recommendation may be determined according to the method of creating a score for a single recommendation.

The score for the individual recommendation may be combined with previously determined scores at individual score summing operation 612. The individual recommendations may be combined by addition. In some embodiments, the scores may be weighted before being included in the sum. The scores may be weighted according to a length of a time period for which the recommendations the scores are associated with were made. For example, a score for a recommendation for one day may be weighted differently than a score for a recommendation for 364 days.

At individual score completion determination operation 614 a determination may be made as to whether all of the recommendations in the plurality of recommendations have been scored and summed. If all of the recommendations have not been scored and summed, the method may return to individual score determination operation 610 to determine a score for another individual recommendation. If all of the recommendations have been scored and summed, the method may proceed to 616 individual score averaging operation.

The sum of the scores of the individual recommendations may be averaged at individual score averaging operation 616.

The scores may be averaged by dividing the sum of the scores by the number of recommendations in the plurality of recommendations. In some embodiments where the scores are not weighted before being summed at operation 612, the sum of the scores may be divided by a weighted number of recommendations. For example, each recommendation may not be counted as one depending on a length of a time period associated with the recommendation.

At normalizing operation 618, the averaged score may be normalized. The averaged score may be normalized by the opportunity associated with the stock for the time periods associated with the recommendations.

Figure 4:
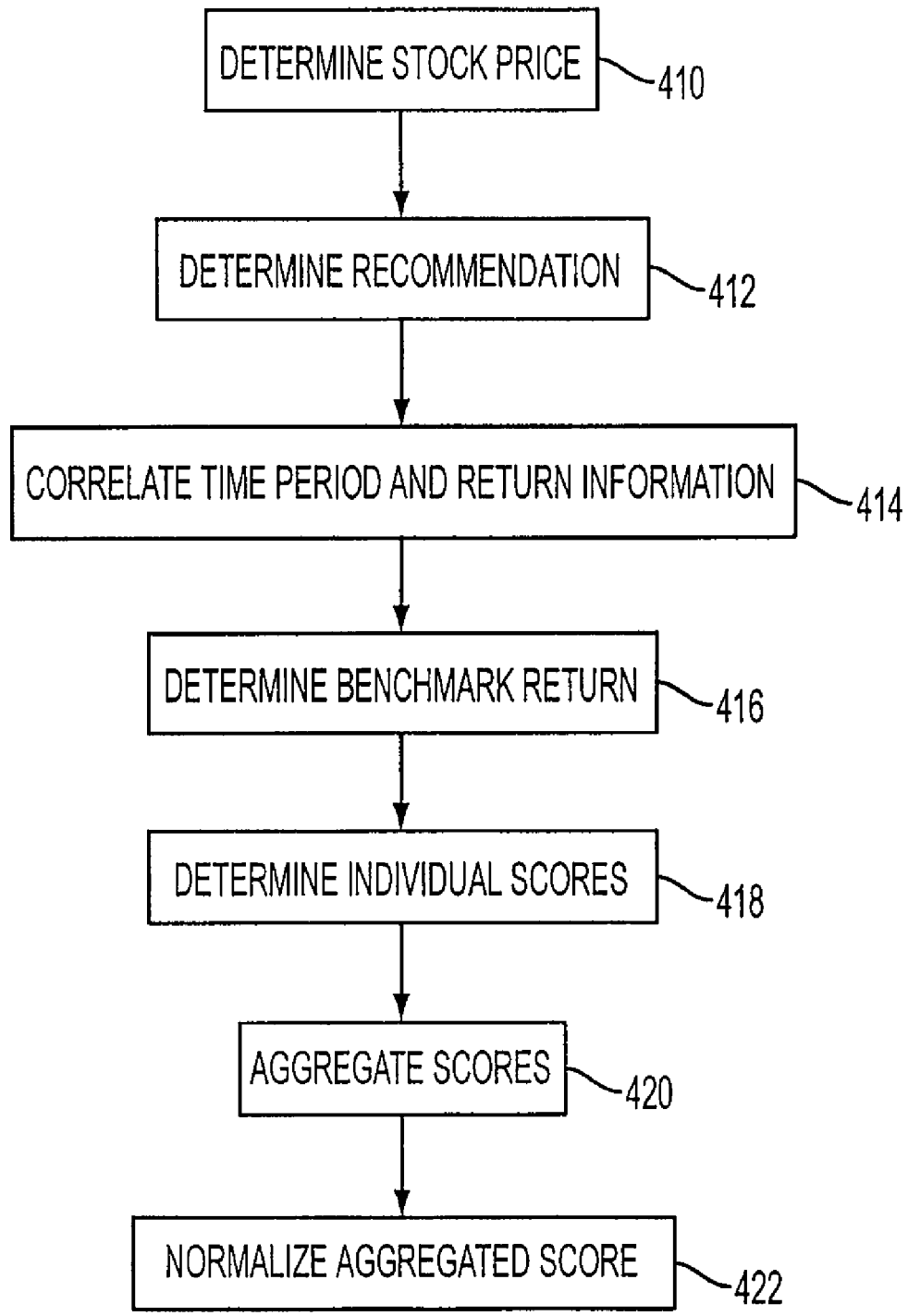
FIG. 4 illustrates an operation according to various embodiments of the invention.

FIG. 4 illustrates an exemplary embodiment of a method of determining score for recommendations made by a single contributor on a single stock (stock A). The method may include a stock value determination operation 410. Stock value determination operation 410 may determine the value for stock A from market information at predetermined intervals, such as a daily interval, or other intervals. Value information for stock A may be assembled in a format similar to an exemplary embodiment illustrated by Table 1.

TABLE 1

| Date | Day 1 | Day 2 | Day 3 | Day 4 | Day 5 |
|---|---|---|---|---|---|
| Price | 5 | 3 | 4 | 5 | 2.5 |
| Adjust for split | 2.5 | 1.5 | 2 | 2.5 | 2.5 |

The method may include a recommendation determination operation 412. At recommendation determination operation 412 recommendation information related to the recommendations by the contributor for stock A may be assembled. The recommendation information assembled by recommendation determination operation 412 may assembled in a format similar to an exemplary embodiment illustrated by Table 2.

TABLE 2

| Stock | Rec. | Start Date | End Date |
|---|---|---|---|
| A | Neutral | Dec. 20, 2003 | Feb. 4, 2003 |
| A | Positive | Feb. 4, 2003 | Jun. 25, 2003 |
| A | Stop | Jun. 25, 2003 | Jul. 28, 2003 |
| A | Positive | Jul. 28, 2003 | Sep. 25, 2003 |
| A | Stop | Sep. 25, 2003 | Sep. 28, 2003 |
| A | Positive | Sep. 28, 2003 | Nov. 2, 2003 |
| A | Negative | Nov. 2, 2003 | still active |

The method may include a time period-return correlation operation 414. At time period-return correlation operation 414 time period information assembled at recommendation determination operation 412 may be intervalized with stock value information gather at stock price determination operation 410. The intervalized time period-return data produced by time period-return operation 414 may be intervalized according to an exemplary embodiment illustrated by Table 3. At time period-return correlation operation 414 a stock return for stock A may be determined for each recommendation period by determining a difference between a stock value for stock A at the beginning of the recommendation period and a stock value for stock A at the end of the recommendation period.

TABLE 3

| Interval # | Interval Start Date | Relative stock prices | Stock Return |
|---|---|---|---|
| Interval 1 | Dec. 31, 2002 | 1 | 0% |
| Interval 2 | Jan. 3, 2003 | 1.15 | 15% |
| Interval 3 | Jan. 31, 2003 | 1.3 | 13% |
| Interval 4 | Feb. 4, 2003 | 1.2 | −8% |
| Interval 5 | Feb. 28, 2003 | 1.2 | 0% |
| Interval 6 | Mar. 31, 2003 | 1.3 | 8% |
| Interval 7 | Apr. 30, 2003 | 1.4 | 8% |
| Interval 8 | May 31, 2003 | 1.3 | −7% |
| Interval 9 | Jun. 25, 2003 | 1.1 | −15% |
| Interval 10 | Jun. 30, 2003 | 1.2 | 9% |
| Interval 11 | Jul. 28, 2003 | 1.4 | 17% |
| Interval 12 | Jul. 31, 2003 | 1.5 | 7% |
| Interval 13 | Aug. 30, 2003 | 1.6 | 7% |
| Interval 14 | Sep. 25, 2003 | 1.7 | 6% |
| Interval 15 | Sep. 28, 2003 | 1.6 | −6% |
| Interval 16 | Sep. 30, 2003 | 1.5 | −6% |
| Interval 17 | Oct. 31, 2003 | 1.5 | 0% |
| Interval 18 | Nov. 2, 2003 | 1.7 | 13% |
| Interval 19 | Nov. 30, 2003 | 1.4 | −18% |
| Interval 20 | Dec. 31, 2003 | 1.5 | 7% |

The method may include a benchmark return determination operation 416. At benchmark return determination operation 416 a benchmark return for each recommendation interval may be determined. The benchmark return for each recommendation may be associated with the other information previously acquired for the each recommendation in a manner similar to an exemplary embodiment illustrated in Table 4.

TABLE 4

| Rec. # | Rec. | Weekdays in call interval | Stock Return | Benchmark Return | Start Date | End Date |
|---|---|---|---|---|---|---|
| 1 | Neutral | 35 | 30.0% | 2% | Dec. 31, 2002 | Feb. 4, 2003 |
| 2 | Positive | 141 | 0.0% | 10% | Feb. 4, 2003 | Jun. 25, 2003 |
| 3 | Stop | 33 | −7.7% | 20% | Jun. 25, 2003 | Jul. 28, 2003 |
| 4 | Positive | 59 | 33.3% | 5% | Jul. 28, 2003 | Sep. 25, 2003 |
| 5 | Stop | 3 | 6% | −5% | Sep. 25, 2003 | Sep. 28, 2003 |
| 6 | Positive | 35 | −11.8% | 2% | Sep. 28, 2003 | Nov. 2, 2003 |
| 7 | Negative | 59 | −6.7% | −5% | Nov. 2, 2003 | Dec. 31, 2003 |

The method may include an interval score determination operation 418. At interval score determination operation 418 a score related to each recommendation made on stock A by the contributor may be created via a payoff function. The score for each recommendation may be associated with other information related to the recommendation similar to an exemplary embodiment illustrated in Table 5.

TABLE 5

| Call # | Call | Weekdays in call interval | Stock Return | Benchmark Return | Start Date | End Date | Payout |
| --- | --- | --- | --- | --- | --- | --- | --- |
| 1 | Neutral | 22 | 30.0% | 2% | Dec. 31, 2002 | Feb. 4, 2003 | −0.0043 |
| 2 | Positive | 101 | 0.0% | 10% | Feb. 4, 2003 | Jun. 25, 2003 | −0.2200 |
| 3 | Positive | 71 | 17.65% | 7% | Jul. 28, 2003 | Nov. 2, 2003 | 0.0995 |
| 4 | Negative | 43 | −6.7% | −5% | Nov. 2, 2003 | Dec. 31, 2003 | 0.0167 |

The method may include a score aggregation operation 420. At score aggregation operation 420 the scores for each recommendation may be aggregated to determine an aggregated score. Aggregating the scores may include averaging the scores, or otherwise aggregating the scores. In the embodiment illustrated in Table 5, the aggregate score would be −0.06105.

The method may include a score normalization operation 422. At score normalization operation 422, the aggregate score may be normalized. The aggregate score may be normalized according to the opportunity factor associated with the time periods associated with the aggregate score.

What is claimed is:

1. A computer-implemented method of scoring at least one contributor for the performance of the contributor's recommendation with respect to a single stock, the method being implemented in a computer system, the method comprising:
   executing one or more computer program modules on one or more processors of the computer system to create a score for a contributor's recommendation on a stock relative to a benchmark, the score being determined based on a payoff function that determines the score as a function of a plurality of factors, the factors comprising:
   i) a benchmark-relative return on the stock, wherein the benchmark-relative return of the stock is a return on the stock relative to a return on a benchmark that corresponds to the stock; and
   ii) the recommendation made by the contributor;
   wherein the payoff function for a neutral recommendation on the stock has a maximum score at a baseline benchmark-relative return, and has scores that decrease away from the maximum score for benchmark-relative returns greater than and less than the baseline benchmark relative return; and
   storing the score in one or more electronic storage media associated with the server.

2. The method of claim 1 wherein the recommendation is selectable by the contributor from a group of at least three types of recommendations, including a positive recommendation, a neutral recommendation and a negative recommendation, and wherein the payoff function for the positive recommendation is a function having a positive slope with respect to the benchmark-relative return and the payoff function for the negative recommendation is a function having a negative slope with respect to the benchmark-relative return.

3. The method of claim 1 wherein the recommendation is selectable by the contributor from a group of at least five types of recommendations, including a positive recommendation, a more positive recommendation, a neutral recommendation, a negative recommendation and a more negative recommendation, and wherein the payoff function for the positive recommendation is a function having a first positive slope with respect to benchmark-relative return and a first positive function baseline value at the baseline benchmark-relative return, the payoff function for the more positive recommendation is a function having a second positive slope with respect to benchmark-relative return greater than the first positive slope and a second positive function baseline value that is offset in a positive direction from the first positive function baseline value along a benchmark-relative return axis, the payoff function for the negative recommendation is a function having a first negative slope with respect to benchmark-relative return and a first negative function baseline value at the baseline benchmark-relative return, and the payoff function for the more negative recommendation is a function having a second negative slope with respect to benchmark-relative return more negative than the first negative slope and a second negative baseline value that is offset in a negative direction from the first negative function baseline value along the benchmark-relative return axis.

4. The method of claim 1, wherein the baseline benchmark-relative return is zero.

5. The method of claim 1, wherein the benchmark includes a variable benchmark, including one of a sector benchmark, an industry benchmark, a geographic benchmark or a coverage benchmark.

6. The method of claim 1, wherein the contributor is an analyst, and the analyst is associated with a broker and the benchmark comprises a broker-specific benchmark.

7. The method of claim 1, wherein the contributor is an analyst, and the analyst is associated with a broker and where different brokers may associate recommendations with different numerical scales, the method further comprising the step of standardizing a recommendation to a common numerical scale.

8. The method of claim 1, further comprising executing one or more program modules on the one or more processors of the computer system to normalize the score for the contributor's recommendation for the stock.

9. The method of claim 1, further comprising executing one or more program modules on the one or more processors of the computer system to normalize the score for the contributor's recommendation for the stock based on the volatility of the stock.

10. The method of claim 1, further comprising executing one or more program modules on the one or more processors of the computer system to aggregate the score for the contributor's recommendation for the stock with one or more other scores for recommendations made by the contributor on the stock to create a stock-level score, executing one or more program modules on the one or more processors of the computer system to normalize the stock-level score to create a normalized stock-level score, and executing one or more program modules on the one or more processors of the computer system to create a stock set-level score by combining the normalized stock-level score with at least one other normalized stock-level score for recommendations made on another stock.

11. The method of claim 1, wherein a score is based at least in part on a period of time and further comprising executing one or more program modules on the one or more processors of the computer system to adjust an contributor's score if the contributor's recommendation covers only a portion of the period of time.

12. A system configured to score at least one contributor for the performance of the contributor's recommendation with respect to a single stock, the score for the recommendation depending on a plurality of factors, including the performance of the stock, the performance of a benchmark and the recommendation made by the contributor, the system comprising:
a server configured to access, over a network, one or more electronic storage media storing information relating to stock performance, benchmark performance and contributor's recommendations; and
one or more processors associated with the server configured to create a score for a recommendation of a contributor on an individual stock based on a payoff function, wherein the payoff function for a neutral recommendation on the stock has a maximum in score at a baseline benchmark-relative return on the stock, and has scores that decrease away from the maximum score for benchmark-relative returns greater than and less than the baseline benchmark relative return, wherein the benchmark-relative return on the stock is a return on the stock relative to a return on a benchmark that corresponds to the stock.

13. The system of claim 12 wherein the recommendation is selectable by the contributor from a group of at least three types of recommendations, including a positive recommendation, a neutral recommendation and a negative recommendation, and wherein the payoff function for the positive recommendation is a function having a positive slope with respect to benchmark-relative return and the payoff function for the negative recommendation is a function having a negative slope with respect to benchmark-relative return.

14. The system of claim 12 wherein the recommendation is selectable by the contributor from a group of at least five types of recommendations, including a positive recommendation, a more positive recommendation, a neutral recommendation, a negative recommendation and a more negative recommendation, and wherein the payoff function for the positive recommendation is a function having a first positive slope with respect to benchmark relative return and a first positive function baseline value at the baseline benchmark-relative return, the payoff function for the more positive recommendation is a function having a second positive slope with respect to benchmark relative return greater than the first positive slope and a second positive function baseline value that is offset in a positive direction from the first positive function baseline value along a benchmark-relative return axis, the payoff function for the negative recommendation is a function having a first negative slope with respect to benchmark relative return and a first negative function baseline value at the baseline percent benchmark-relative return, and the payoff function for the more negative recommendation is a function having a second negative slope with respect to benchmark relative return more negative than the first negative slope and a second negative baseline value that is offset in a negative direction from the first negative function baseline value along the benchmark-relative return axis.

15. The system of claim 12, wherein the benchmark includes a fixed benchmark or a variable benchmark.

16. The system of claim 12, wherein the baseline benchmark-relative return is zero.

17. The system of claim 12, wherein the contributor is an analyst, and the analyst is associated with a broker and the benchmark comprises a broker-specific benchmark.

18. The system of claim 12, wherein the contributor is an analyst, and the analyst is associated with a broker and where different brokers may associate recommendations with different numerical scales, the one or more processors further being configured to standardize a recommendation to a common numerical scale.

19. The system of claim 12, wherein the one or more processors are further configured to normalize the score for the contributor's recommendation for the stock.

20. The system of claim 12, wherein the processing section within the server is configured to execute the computer software program to normalize the score for the contributor's recommendation for the stock based on the volatility of the stock.

21. The system of claim 12, wherein the one or more processors are configured to aggregate the score for the contributor's recommendation for the stock with one or more other scores for recommendations made by the contributor on the stock to create a stock-level score, to normalize the stock-level score to create a normalized stock-level score, and to create a stock set-level score by combining the normalized stock-level score with at least one other normalized stock-level score for recommendations made on another stock.

22. The system of claim 12, wherein a score is based at least in part on a period of time and further wherein the one or more processors are further configured to adjust an contributor's score if the contributor's recommendation covers only a portion of the period of time.

23. The system of claim 12, wherein the one or more processors are further configured to generate a display conveying the score.

* * * * *